Patented Dec. 15, 1931

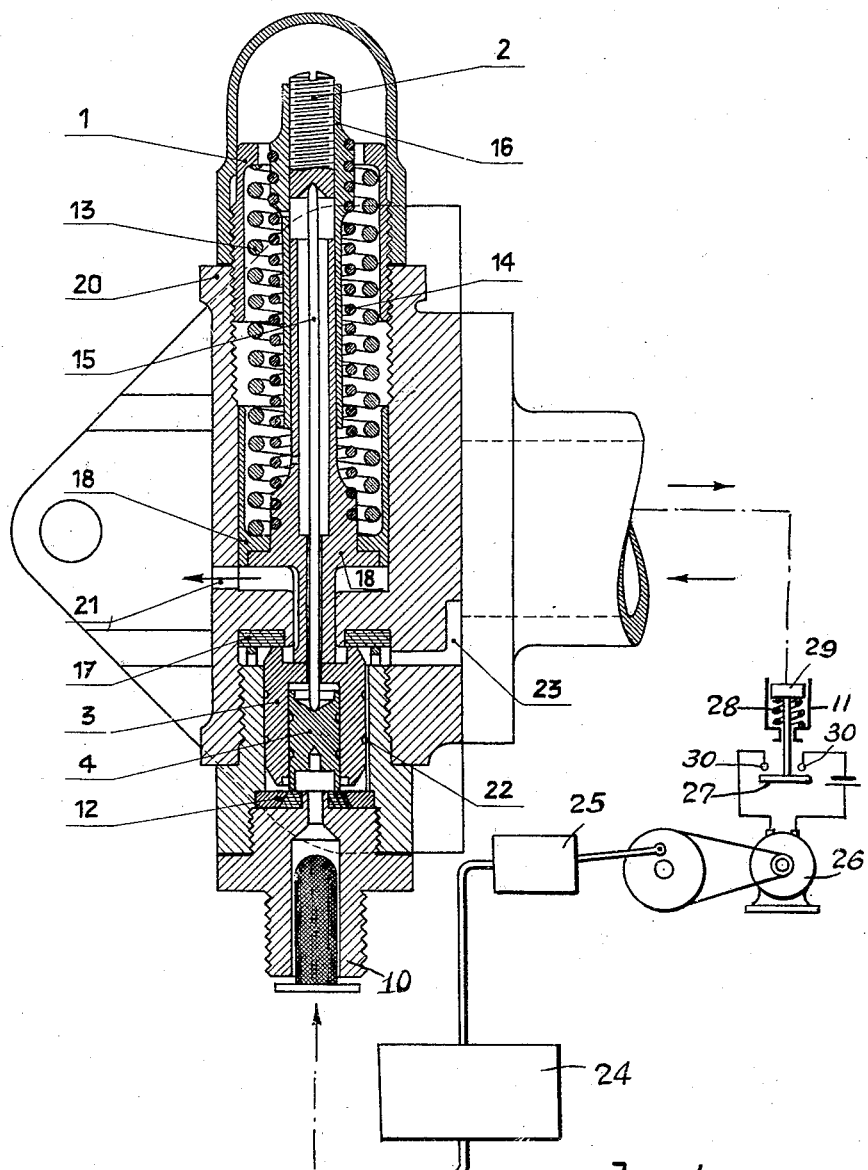

1,836,416

UNITED STATES PATENT OFFICE

PAUL WEBER, OF OLTEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

AIR PRESSURE REGULATOR

Application filed August 22, 1927, Serial No. 214,702, and in Switzerland August 26, 1926.

This invention relates to control apparatus responsive to the variations of pressure of an elastic fluid, and is particularly concerned with the automatic control of motor-driven air compressors on electric locomotives or motor coaches, in which it is desired to maintain the air pressure between certain maximum and minimum values, this being accomplished by disconnecting the motor driving the compressor when the pressure exceeds the prescribed upper limit and reconnecting the motor when the pressure has fallen below a similarly prescribed lower limit.

The object of the present invention is the provision of simple and reliable apparatus of the class described which is capable of effecting a quick make or break of the switch contacts controlling the motor circuit without the addition of auxiliary gear for this purpose.

Another object is the provision of apparatus of the class described which is of robust construction and capable of standing up to the exacting conditions encountered on locomotives and the like.

Other and further objects will be pointed out or indicated hereinafter or will be obvious to one skilled in the art upon an understanding of the invention or its employment in practice.

In the drawing forming a part of this specification I illustrate one embodiment of this invention, but it is to be understood that it may take other structural forms without departing from the scope of the appended claims.

In the drawing the figure is an illustration in the nature of a sectional elevation of an air pressure regulator embodying the invention, showing in diagrammatic fashion the manner in which the regulator is connected in an air-compressing system.

The electrically driven air compressors used on electric locomotives and motor coaches for supplying compressed air to the brakes, require some form of regulator which will automatically stop the motor when the pressure reaches the allowable maximum and restart it again when the pressure has fallen below the allowable minimum value. Such regulators are old in the art but have hitherto always presented a number of disadvantages, chief among which is an inability to effect a quick make and break of the pneumatically-operated switch contacts. A quick make and break is essential if sticking and welding together of the contacts is to be avoided, and it has therefore been necessary to employ special auxiliary gear on the switch for this purpose, the compressed air engine controlled by the regulator merely giving the initial impulse for the operation of the said gear. The present invention provides an apparatus which ensures the desired operating characteristics by purely pneumatic means without resort to auxiliary quick-action gear on the switch itself. The whole of the apparatus is considerably simplified thereby and its operation rendered more reliable, besides being better equipped to withstand the arduous conditions encountered in railway working.

The invention will be best understood by reference to the drawing accompanying this specification, which illustrates an air pressure regulator in part sectional elevation.

Referring to the figure, let it be understood that the reference character 20 represents the casing of the pressure regulator which is connected by the screwed connection 10 to the reservoir 24 supplied by the motor-driven compressor 25. The motor 26 driving this compressor is controlled by a switch 27 actuated by an air engine, the cylinder of this air engine being shown at 11 on the drawing. The switch 27 is normally held closed by a spring 28. A passage 23 communicates with the operating cylinder 11, and a second passage 21 leads to atmosphere. Situated in the lower part of the casing are two valves 3 and 4 of the piston type arranged to work one within the other. These valves are loaded by springs of different strengths, a relatively strong spring compression cooperating with the larger valve 3 and a relatively weak tension spring cooperating with the smaller valve 4. When both valves are raised, the compressed air from the reservoir 24 is given access to the operating cylinder 11 of the air engine by way of a groove 22 cut in the guide surface of the valve 3. Each valve is provided with a working edge cooperating with the valve seat 12 and thereby interrupting the flow of air from the reservoir to the cylinder 11. The outer valve 3 is double-acting, being provided with an upper working edge which cooperates with the seat 17 and thereby controls the connection between the cylinder 11 and the passage 21 leading to the atmosphere. Thus, when the valve 3 is raised, communication between the operating cylinder and the atmosphere is cut off. The valve 4 is held down to its seat by the valve rod 15 through the tension spring 14 acting on the adjusting screw 2 forming part of the sleeve 16 which is in turn connected to the guide bush 18. The said guide bush, which is shown in two parts on the drawing, is arranged in sliding relationship with the casing 20 and is held down by a second helical compression spring 13 which bears against the screw cap 1. By adjusting this cap the initial compression of the spring 13 may be varied as desired. The strength of this outer spring is considerably in excess of that of spring 14. An extension of the guide bush 18 rests on the valve 3 as shown. The force required to lift valve 3 is greater than that required to lift valve 4 by an amount substantially proportional to the difference between the stiffness of the springs. The operation of the apparatus is as follows.

As soon as the pressure in the reservoir 24 rises above that for which the adjusting screw 2 is originally set, the valve 4 will be raised from its seat 12 and the inner annular space beneath the valve 3 will be filled with air at the pressure of the reservoir. Assuming that this pressure continues to rise, due to the working of the compressor, a point will be reached when the pressure beneath the valve 3 exceeds that for which the spring 13 is set, and the valve will then be raised. As soon as this happens the effective area of the valve face is increased, with the result that the upward movement of the valve is completed suddenly, thus cutting off the passage 21 leading to the atmosphere. At the same time compressed air is admitted to the operating cylinder 11 via the groove 22 and the passage 23, operating the air engine and opening the switch 27 controlling the motor 26, with the consequence that the compressor is stopped.

If now the pressure of the air in the reservoir should fall to the minimum value prescribed, the valve 4 will first be returned to its seat by the spring 14, thus cutting off the air in the reservoir 24 from valve 3. The position of the valves corresponding to this state of affairs is shown in the drawing. The supply of air to the cylinder 11 being thus cut off, the leakage which is always taking place between the two valves and past the valve seat 17 will cause a fairly rapid fall of pressure in the cylinder and hence, shortly after the return of the low-pressure valve 4, the high-pressure valve 3 will also be returned to its seat under the influence of the spring 13. The cylinder 11 is thus put into communication with the atmosphere, resulting in the sudden release of the piston 29 of the air motor and consequent closing of the switch 27. The compressor 25 is then started up and the sequence of operations previously described is repeated until the pressure in the air reservoir 24 once more reaches the maximum value.

Since the movement of the high-pressure valve 3 is always sudden as explained above, a quick make and break of the switch contacts 30 is ensured, and any tendency of the contacts to stick or become welded together is avoided. The apparatus is therefore suitable for the control of pneumatically-operated switches employing high contact pressures and interrupting considerable powers.

The adjustment of the upper and lower pressure limits is effected by a suitable choice of the size and initial compression or tension of the springs 13 and 14 or by varying the effective diameters of the associated valves. If necessary, a combination of both the above methods may be used.

What I claim is:

1. In regulating apparatus of the character described, a casing provided with inlet and outlet openings and a fluid-exhaust opening, valves disposed one within the other and within said casing for relative cooperative movement to a given position such as to provide communication between said inlet and outlet openings and to close said fluid-exhaust opening with respect to said inlet and outlet openings and for movement to a different position to provide communication between said fluid-exhaust opening and said outlet opening and to close said inlet opening with respect to said fluid-exhaust opening and said outlet opening, operating action of one of said valves being dependent upon such action of the other, and spring means urging said valves to said different position thereof.

2. In regulating apparatus of the character described, a casing provided with inlet and outlet openings and a fluid-exhaust opening, a hollow open-ended valve disposed in said casing for sliding movement to a given position and being operable at said position to seat at its open end over said inlet opening and for such movement to a different position and being operable thereat to seat at its other end over said fluid-exhaust opening, spring means urging said valve to said given position thereof, a second valve disposed within said first-named valve for relative sliding movement with respect thereto into and out of seated position over said inlet opening, and spring means urging said second valve into seated position.

In testimony whereof I have hereunto subscribed my name at Basel, Switzerland, this 8th day of August, A. D. 1927.

PAUL WEBER.